United States Patent [19]

Hungerford

[11] 4,389,437
[45] Jun. 21, 1983

[54] BOIL RESISTANT FILM LAMINATE AND RETORTABLE FOOD POUCH THEREFROM

[75] Inventor: Gordon P. Hungerford, Palmyra, N.Y.

[73] Assignee: Mobil Oil Corporation, New York, N.Y.

[21] Appl. No.: 334,764

[22] Filed: Dec. 28, 1981

[51] Int. Cl.³ .................. B65D 89/00; B32B 27/40; B32B 27/32
[52] U.S. Cl. .................. 428/35; 428/214; 428/215; 428/516; 428/517; 428/520; 229/53
[58] Field of Search .............. 428/35, 516, 517, 520, 428/214, 215

[56] References Cited

U.S. PATENT DOCUMENTS 3,453,173 7/1969 Isley et al. .................. 428/520 X
4,123,576 10/1978 Kobayashi et al. .......... 428/516 X
4,230,761 10/1980 Watts ........................... 428/517 X

FOREIGN PATENT DOCUMENTS 55-48156 11/1980 Japan .......................... 428/516

Primary Examiner—P. Ives
Attorney, Agent, or Firm—Charles A. Huggett; James F. Powers, Jr.; James P. O'Sullivan, Sr.

[57] ABSTRACT

A flexible film laminate and retortable pouch therefrom comprising a first layer of heat-sealable polyolefin film; a first adhesive layer contacting said polyolefin film, said first adhesive being a maleic acid anhydride adduct of an ethylene-propylene copolymer; a second adhesive layer contacting said first adhesive layer, said second adhesive being a combination of a styrene-butadiene block copolymer and a random terpolymer, said second adhesive also contacting; a second layer of a polyacrylonitrile homopolymer film; said laminate having been subjected to ultra violet radiation through said second layer to an extent resulting in a greater bond strength between layers than in the absence of said radiation.

9 Claims, No Drawings

BOIL RESISTANT FILM LAMINATE AND RETORTABLE FOOD POUCH THEREFROM

BACKGROUND OF THE INVENTION

The present invention relates to a flexible, boil resistant film laminate and to retortable food pouches fabricated therefrom.

Certain packaging applications, for example, retort packaging, require that the packaging material constitute a good barrier to the passage of oxygen and moisture vapor. In addition, the packaging of certain foods require that a minimum of oxygen or air are transmitted to the contents. Cheese is one food product which should be packaged to the exclusion of oxygen.

Oriented polyacrylonitrile (PAN) film has excellent oxygen barrier properties. Its moisture barrier properties, however, are less than desirable for retort packaging. Furthermore, it is not heat sealable to itself. Both deficiencies can be overcome by applying to one surface of the PAN a layer of a thermoplastic material having good moisture barrier properties. However, because of the significant chemical dissimilarity between PAN and thermoplastic moisture barrier polymers, such as polyolefins, adhesion between the two materials is poor and package integrity suffers. It is necessary, therefore, to consider the imposition of an adhesive or bonding system between the PAN and the thermoplastic moisture barrier which will result in acting as a mutually adherent bridge between the two materials. It has been found, however, that materials which exhibit good adhesion to PAN do not exhibit good adhesion to materials such as a polyolefin film.

In addition, the prior practice of providing an adhesive bridge between PAN and an effective moisture barrier film, has involved the application of an adhesive such as polyurethane or a polyester in a liquid vehicle. By this means, the adhesive is applied to the PAN and subsequently the moisture barrier film is laminated to the PAN via the adhesive. Such procedures, in spite of the use of such expensive adhesives, have not resulted in supplying the industry with an economical and effective flexible film laminate for retortable foodpouch use.

In recent years, the food packaging industry has shown intense interest in the concept of pouch-packed foods which, among other advantages, do not require freezing for their preservation and can therefore dispense with costly and energy intensive refrigerated transportation and storage facilities. Much effort has gone into the development of a flexible retort, or autoclaveable, food pouch which not only can withstand the rigors of sterilization and later reheating and provide barrier properties which are sufficient to adequately protect the contents during storage, but which also employs materials that are toxicologically safe.

In accordance with U.S. Pat. No. 3,453,173, a polyolefin-polyacrylonitrile laminate, which is said to possess superior heat-seal strength and excellent barrier properties to the transmission of gases and is adaptable for the construction of food containers, is prepared by bringing the polyolefin surface and the polyacrylonitrile surface together and adhering the adjacent surfaces to each other through an adhesive. Either or both surfaces can be pre-treated in some manner in an effort to make them more adherent, e.g., by treatment with a gaseous mixture of boron trifluoride, as described in British Pat. No. 834,196; by flame treatment or by treatment by corona discharge as described in U.S. Pat. No. 2,632,921. Among the adhesives employed in the manufacture of the laminate is an ethylene-vinyl acetate copolymer described in U.S. Pat. No. 2,200,429. Because the conditions of preparation and the adhesives contemplated are not conducive to the formation of primary valence bonding, the interlaminar adhesion in boiling water would not be expected to be strong.

Resort also has been had to metalizing the PAN film in order to employ the metal layer as an effective surface through which adhesion can be accomplished to the water vapor barrier film.

SUMMARY OF THE INVENTION

In accordance with the present invention, a boil-resistant flexible film laminate adaptable for use in the manufacture of a retortable pouch for the packaging of food is provided which comprises: (a) a first layer of a heat-sealable polyolefin film; (b) a first adhesive layer contacting said polyolefin film, said first adhesive being a maleic acid anhydride adduct of an ethylene-propylene copolymer; (c) a second adhesive layer contacting said first adhesive layer, said second adhesive being a combination of a styrene-butadiene block copolymer and a random terpolymer of from about 30 to about 40 parts by weight of 1,3-pentadiene; about 30 to about 40 parts by weight of a monocyclic terpene and from about 25 to about 35 parts by weight of alpha-methylstyrene, said combination consisting of from about 1 to about 3 parts by weight of the block copolymer, to from about 3 to about 1 parts by weight of the terpolymer, said second adhesive also contacting; (d) a second layer of polyacrylonitrile homopolymer film; said laminate having been subjected to ultraviolet radiation through said second layer to an extent resulting in a greater bond strength between layers than in the absence of said radiation.

DESCRIPTION OF THE PREFERRED EMBODIMENTS

The polyolefins which are useful herein include the film-forming homopolymers and copolymers formed by the polymerization of one or more $C_2$–$C_8$ alpha-olefins, for example, ethylene, propylene, butene-1, pentene-1, hexene-1, heptene-1, octene-1, etc. The useful polyolefins also include film-forming copolymers of one or more of the aforesaid alpha-olefins copolymerized with up to 20 weight percent total, and preferably not more than 5 weight percent total, of one or more other monomers copolymerizable with the alpha-olefin, for example, carbon monoxide; sulfur dioxide; acrylic acid or an acrylate ester such as methyl acrylate, amyl acrylate, hexyl acrylate, cyclohexyl acrylate, and the like; methacrylic acid or a methacrylate ester, such as methyl methacrylate, ethyl methacrylate, propyl methacrylate, butyl methacrylate, amyl methacrylate, and the like; vinyl acetic acid or a vinyl ester such as vinyl formate, vinyl acetate, vinyl propionate, vinyl butyrate, vinyl benzoate, isopropenyl acetate and the like.

Procedures for the polymerization of alpha-olefins and the copolymerization of alpha-olefins with other monomers such as those recited herein are well known and do not constitute a part of this invention. The polyolefins which are useful herein can be atactic, isotactic, syndiotactic, crystalline or amorphous or a combination of any of the foregoing. The preferred polyolefin films are the homopolymers and the copolymers of ethylene and propylene. A particularly preferred polyolefin film is a random copolymer of propylene with a minor amount of ethylene (commercially available from Exxon Corporation as EX-24). Good adhesion can be obtained without subjecting the films of the present invention to a surface treatment, however, better adhesion is obtained by subjecting the polyolefin films to corona discharge and/or by other equivalent means. Among all the adhesives which have been studied for use in the present four layer system, one particular adhesive has been discovered to be effective as being part of the bonding system between the heat sealable polyolefin layer and the PAN layer. This material is the maleic acid anhydride adduct of ethylene-propylene copolymer, one of which, Morprime 78LJ10 (Morton Chemical, Division of Morton Norwich Products, Inc.) has been found to be effective. In addition, this material has been cleared for use in food packaging by the FDA and is commercially available.

As indicated above, the prior art laminate disclosed in U.S. Pat. No. 3,453,173 possesses properties which tend to make it a particularly worthwhile candidate for use in the construction of a food pouch, however, it has been observed that no, or at most very little, bonding of the polyolefin layer to the PAN layer is obtained if the sole adhesive is the aforementioned Morprime 78LJ10. This adhesive is an effective adhesive to the polyolefin but not to the PAN film.

The second adhesive not only must be an effective adhesive to the PAN film but under the conditions of the present invention it also must be an effective bonding system to the Morprime 78LJ10 adhesive. The second adhesive is actually a combination of two materials, the first of which is a styrene-butadiene block copolymer and the other is a random terpolymer of from about 30 to about 40 parts by weight of 1,3-pentadiene; about 30 to about 40 parts by weight of a monocyclic terpene; and from about 25 to about 35 parts by weight of alpha-methyl styrene. This combination consists of from 1 to 3 parts by weight of the block copolymer and from 3 to about 1 parts by weight of the terpolymer. The first material of this combination is also a commercially sold product available under the name Kraton 1000, Series Products (Shell Chemical Co., Polymers Division). One material Kraton 1102, styrene-butadiene block copolymer has the following properties determined at about 23° C. on films cast from a toluene solution: tensile strength, psi 4600; 300% Modulous, psi 400; Elongation percent, 880; hardness, shore A 62; Angle Tear Strength-Die C, pli 190; Specific Gravity 0.94; and Solution Viscosity-25% w, cps from a toluene solution, 1200.

The second component of this adhesive combination is a resinous random terpolymer which contains from about 30 to about 40 parts by weight of 1,3-pentadiene; about 30 to about 40 parts by weight of a monocyclic terpene; and about 25 to about 35 parts by weight of alpha methylstyrene. Although a preferred monocyclic terpene for employment in the present combination is beta-phellandrene, other monocyclic terpenes, or mixtures thereof, may be employed. These include dipentene, alpha-terpinene, beta-terpinene, alpha phellandrene, gama-terpinene, terpinolene, sylvestrene, origanene, the pyronenes, and the like.

It is preferred that the terpolymer additive exhibit the following properties:
melting point range (ring and ball) 75°-125° C.;
specific gravity 1.08-0.90;
bromine number 6-14;
iodine number 79;
acid value, less than 1;
soponification number, less than 1;
decomposition temperature (in air) 300° C.;
color (in 50% toluene solution) Gardner 6; and
viscosity (in toluene) 70%.

A particularly preferred random terpolymer is prepared by polymerizing a feed stream containing 37.5% by weight 1,3-pentadiene, 37.5% by weight beta-phellandrene, and 25% by weight of alpha methylstyrene in a toluene diluent in the presence of an aluminum chloride catalyst. The resulting terpolymer contains 34.0 parts by weight of 1,3-pentadiene, 36.5 parts by weight of beta-phellandrene and 29.5 parts by weight of alpha methylstyrene. This material has a molecular weight (weight average) of 1880, a bromine number of 14, an iodine number of 79, a glass transition temperature of 38° C., a viscosity in toluene, f to g, of 70% and a decomposition temperature (in air) of 300° C.

The homopolymer polyacrylonitrile (PAN) film can be prepared by the polymerization and film formation methods described in U.S. Pat. No. 4,066,731 to Hungerford (Mobil Oil Corporation) which is incorporated in its entirety herein by reference. It should possess an oxygen permeability rate of less than about 10 cc/100 in$^2$/24 hr./atm. at 100° F., more preferably less than 0.1 cc/100 in$^2$/24 hr./atm. at about 73° F., and a water vapor trasmission rate preferably less than about 50 g/100 in$^2$/24 hr. at 100° F. and 90% relative humidity, more preferably less than about 10 g/100 in$^2$/24 hr. at 100° F.

The aforesaid oxygen and water vapor transmission rates can be determined by various methods known in the art. For example, oxygen transmission rates can conveniently be measured with a Dohrmann polymeric permeation analyzer, PPA-1 (Dohrmann Envirotech Corp., Mountain View, Calif. The Dow cell can also be employed for this purpose, in accordance with ASTM D-1434.

The individual films comprising the laminate described herein can be prepared in widely varying thickness, for example, from about 0.1 mils to about 10 mils and preferably from about 0.5 mil to about 5 mils.

The four layers which comprise the laminate of the present invention can be assembled in a variety of ways. For example, the maleic acid anhydride adduct of ethylene-propylene copolymer can be applied to the polyolefin film from a dispersion of the adhesive in a high boiling aliphatic hydrocarbon. Following this, the combination adhesive, styrene-butadiene block copolymer mixed with the random terpolymer can be deposited on the PAN film out of a suitable solution, e.g., a toluene solution. The two adhesive coated films can then be laminated together with the individual adhesive layers in face to face relationship. Effective interfacial lamination can be facilitated by the appropriate use of pressure and/or heat.

It is also contemplated to apply the adhesive combination of the styrene-butadiene block copolymer and the random terpolymer to the PAN and thereafter apply the maleic acid anhydride adduct of ethylene-propylene copolymer to this adhesive layer. After appropriate drying the polyolefin layer can be laminated by any suitable means to this adhesive arrangement.

After the several layers of the present invention have been laminated together an effective bond between the layers is accomplished by irradiating the layers through the PAN film with an appropriate amount of ultra violet (UV) radiation. Techniques for irradiating these films are well known to those skilled in the art. The degree of ultra violet radiation should be such that it will produce a bond of greater strength between the layers than in the absence of said radiation. Typical sources for the UV radiation are a one kilowatt, high pressure, water cooled, mercury vapor lamp, or a 140 watt Hanovia UV lamp, type 30600. The distance of the irradiation source to the film will generally depend upon ultra violet radiation source but generally will be from about 1 to about 10 inches and preferably from about 1½ to about 5 inches.

EXAMPLE

A strip of corona treated, three mil thick film, of a random copolymer of propylene, with a minor amount of ethylene (commercially available from Exxon Corporation as EX-24) is coated with a 15 weight percent dispersion of a maleic acid anhydride adduct of an ethylene-propylene copolymer adhesive in a hydrocarbon vehicle and dried at a temperature sufficient to drive off the hydrocarbon vehicle. This temperature is below the melting point of the polyolefin film and below the melting point of the adhesive. A corresponding strip of biaxially oriented polyacrylonitrile homopolymer film of approximately 0.65 mil thick, is coated with a toluene solution containing 25% by weight solids, of a combination containing 6 parts by weight of a styrene-butadiene block copolymer and 13 parts by weight of a terpolymer of 34 parts by weight of 1,3-pentadiene, 36.5 parts by weight of beta-phellandrene and 29.5 parts by weight of alpha methylstyrene. This layer is dried at about 230° F. for about 20 minutes.

These adhesive coated films are pressed together under modest pressure at least sufficient to cause a substantially uniform interfacial contact between the adhesives. The laminate is then heated at about 380° F. for about 45 seconds.

This laminate is irradiated with ultra violet light through the PAN using a 1 KW, high pressure, water cooled mercury vapor lamp for about 2 minutes and 50 seconds. This will yield a laminate which can be peeled apart but only with high force, i.e., a force significantly greater than 1½ lbs./in.

Attempts to laminate the polyolefin film to the PAN film with the individual adhesive materials, either with or without the contemplated irradiation, will not result in an effective laminate.

The laminates of this invention can be fabricated into retortable pouches employing known methods. In accordance with one such procedure, the laminate can be folded over upon itself with the heat-sealable polyolefin sides facing each other and these faces can be edge sealed between heated plates. Such a pouch can be filled with food or other material, the top heat sealed and an effective retortable pouch is obtained.

What is claimed is:

1. A flexible film laminate comprising:
   (a) a first layer of a heat-sealable polyolefin film;
   (b) a first adhesive layer contacting said polyolefin film; said first adhesive being a maleic acid anhydride adduct of an ethylene-propylene copolymer;
   (c) a second adhesive layer contacting said first adhesive layer, said second adhesive being a combination of a styrene-butadiene block copolymer and a random terpolymer of from about 30 to about 40 parts by weight of 1,3-pentadiene; about 30 to about 40 parts by weight of a monocyclic terpene; and from about 25 to about 33 parts by weight of alpha methylstyrene, said combination consisting of from about 1 to about 3 parts by weight of the block copolymer to from about 3 to about 1 parts by weight of the terpolymer, said second adhesive also contacting;
   (d) a second layer of a polyacrylonitrile homopolymer film; said laminate having been subjected to ultra violet radiation through said second layer to an extent resulting in a greater bond strength between layers than in the absence of said radiation.

2. The flexible film laminate of claim 1 in which the polyolefin layer is a homopolymer or a copolymer of a $C_2$–$C_8$ alpha-olefin.

3. The flexible film laminate of claim 2 in which the polyolefin layer contains up to about 20 weight percent of one or more other monomers copolymerizable with the alpha-olefin.

4. The flexible film laminate of claim 3 in which the polyolefin layer contains not more than about 5 weight percent total of one or more other monomers copolymerizable with the alpha-olefin.

5. The flexible film laminate of claim 2 in which the polyolefin layer is a homopolymer of ethylene or propylene or a copolymer of ethylene and propylene.

6. The flexible film laminate of claim 1 in which said second adhesive combination contains from about 6 parts by weight of said styrene-butadiene block copolymer and about 13 parts by weight of said terpolymer.

7. The flexible film laminate of claim 6 wherein said terpolymer contains beta-phellandrene.

8. The flexible film laminate of claim 1 in which the individual layers range from about 0.1 to about 10 mils in thickness.

9. A retortable food pouch fabricated from a flexible film laminate which comprises:
   (a) a first layer of a heat-sealable polyolefin film;
   (b) a first adhesive layer contacting said polyolefin film, said first adhesive being a maleic acid anhydride adduct of an ethylene-propylene copolymer;
   (c) a second adhesive layer contacting said first adhesive layer, said second adhesive being a combination of a styrene-butadiene block copolymer and a random terpolymer of from about 30 to about 40 parts by weight of 1,3-pentadiene; about 30 to about 40 parts by weight of a monocyclic terpene; and from about 25 to about 35 parts by weight of alpha methylstyrene, said combination consisting from about 1 to about 3 parts by weight of the block copolymer to from about 3 to about 1 parts by weight of the terpolymer, said second adhesive also contacting; and
   (d) a second layer of polyacrylonitrile homopolymer film; said laminate having been subjected to ultra violet radiation through said second layer to an extent resulting in a greater bond strength between layers than in the absence of said radiation.

* * * * *